(12) United States Patent
Ansel et al.

(10) Patent No.: US 7,431,134 B2
(45) Date of Patent: Oct. 7, 2008

(54) GAS SPRING

(75) Inventors: Holger Ansel, Mülheim-Kårlich (DE);
Meik Broeder, Dachsenhausen (DE);
Stefan Bonnekessel, Koblenz (DE);
Stephan Enders, Koblenz (DE);
Alexander Koehl, Trier (DE); Rainer Massmann, Bonn (DE); Rolf Mintgen, Thuer (DE); Marc Nadler, Bendorf (DE); Willi Nieratschker, Koblenz (DE); Rainer Sauer, Mayen (DE)

(73) Assignee: STABILUS GmbH, Koblenz (DE)

( * ) Notice: Subject to any disclaimer, the term of this patent is extended or adjusted under 35 U.S.C. 154(b) by 142 days.

(21) Appl. No.: 11/453,845

(22) Filed: Jun. 16, 2006

(65) Prior Publication Data

US 2007/0045916 A1    Mar. 1, 2007

(30) Foreign Application Priority Data

Jun. 16, 2005  (DE) ........................ 10 2005 028 015
Aug. 11, 2005  (DE) ........................ 10 2005 038 115

(51) Int. Cl.
*F16F 9/06* (2006.01)

(52) U.S. Cl. ........................................ 188/269; 188/315
(58) Field of Classification Search .................. 188/269, 188/268, 297, 315; 267/64.15, 64.16, 64.17
See application file for complete search history.

(56) References Cited

U.S. PATENT DOCUMENTS

| 3,865,356 A | * | 2/1975 | Wossner ...................... 188/269 |
| 3,970,292 A |   | 7/1976 | Dachicourt et al. |
| 4,613,115 A |   | 9/1986 | Smith |
| 6,263,556 B1 |  | 7/2001 | Stephan et al. |
| 6,296,092 B1 | * | 10/2001 | Marking et al. ............. 188/315 |
| 6,648,310 B2 | * | 11/2003 | Rottenberger et al. ....... 188/269 |
| 6,863,163 B2 | * | 3/2005 | Oliver et al. ................. 188/315 |

FOREIGN PATENT DOCUMENTS

| DE | 25 11 289 A1 | 9/1975 |
| DE | 31 41 295 A1 | 4/1983 |
| DE | 33 24 214 A1 | 3/1984 |
| DE | 100 52 864 A1 | 7/2001 |
| DE | 100 52 864 B4 | 3/2005 |

* cited by examiner

*Primary Examiner*—Melanie Torres
(74) *Attorney, Agent, or Firm*—Rothwell, Figg, Ernst & Manbeck, P.C.

(57) ABSTRACT

The invention relates to a gas spring which uses a compensating medium acting on a compensating piston in order to compensate the dependence on temperature of its characteristic. According to a first aspect of the invention, a compensating medium (16M) is selected whereof the critical temperature ($T_K$) is between the lower limit temperature ($T_{lower}$) and a temperature exceeding the upper limit temperature ($T_{upper}$) of the range of operating temperatures of the gas spring (50) by up to 100° C., and the gas spring (50) is designed such that, at an operating temperature ($T_B$) of the gas spring (50) not exceeding the critical temperature ($T_K$) of the compensating medium (16M), the point indicating the state of the compensating medium (16M) lies on or above the vapor pressure curve. According to a second aspect, in order to simplify the structure of the gas spring (50), a single compensating piston (10) which takes the shape of a cup is used and separates the working chamber (1a), the compensating chamber (16) and the restoring chamber (15) of the gas spring (50) from one another.

19 Claims, 4 Drawing Sheets

GAS SPRING

The invention relates to a gas spring having a working cylinder which, together with a compensating piston arrangement, delimits a working chamber filled with a working medium, and a working rod which projects displaceably through an opening in the working cylinder into the working chamber, in which the compensating piston arrangement is acted upon by the pressure of the working medium and the pressure of a compensating medium, which is provided in a compensating chamber and expands if the temperature rises such that the volume of the working chamber increases, and by a restoring medium, which is provided in a restoring chamber such that the volume of the working chamber decreases.

Gas springs of this kind, whereof the purpose is to compensate the dependence on temperature of the gas spring characteristic by the use of the compensating medium, are known in the art. As an example, the reader is referred to DE 31 41 295 A1.

As regards the substances that can be used as the compensating medium, DE 31 41 295 A1 refers in a very general way to a "special fluid". By contrast, DE 25 11 289 A1, which has the same field, specifically mentions hydraulic oil as the compensating medium. According to U.S. Pat. No. 4,613,115, finally, two-phase systems of particular substances are used as the compensating medium or, to be more precise, systems in which the liquid and the gas phase of the substance in question coexist under the respective conditions of pressure and temperature.

However, none of these compensating media has proved satisfactory in all respects in practice. In particular, the mineral oil that is conventionally used does not have a satisfactory useful volumetric expansion within the range of operating conditions for the gas spring which is conventionally in question, between a temperature of approximately $-30°$ C. and a pressure of approximately 50 bar, on the one hand, and a temperature of approximately $+80°$ C. and a pressure of approximately 440 bar, on the other. In the context of the present invention, the term "useful volumetric expansion" is used to mean the difference between the increase in volume brought about by a rise in temperature and the decrease in volume brought about by a simultaneous rise in pressure.

It is thus an object of the present invention to provide gas springs of the type mentioned at the outset which have improved compensation of the dependence on temperature of the gas spring characteristic.

In accordance with the invention, this object is achieved by a gas spring of the type mentioned at the outset, in which the compensating medium is selected such that its critical temperature is between a first temperature and a second temperature, with the first temperature being substantially the same as the lower limit temperature of a range of operating temperatures of the gas spring, and the second temperature exceeding the upper limit temperature of the range of operating temperatures of the gas spring by approximately 100° C., and in which the surface of the compensating piston arrangement on which the compensating medium acts, the surface of the compensating piston arrangement on which the working medium acts, the volume of the working chamber at a design temperature of the gas spring, the volume of the compensating chamber at the design temperature of the gas spring and the restoring force of the restoring medium acting on the compensating piston arrangement at the design temperature of the gas spring are dimensioned and matched to one another such that, at an operating temperature of the gas spring which does not exceed the critical temperature of the compensating medium, the point indicating the state of the compensating medium lies on or above the vapor pressure curve.

The inventors' achievement is to have recognized that, in addition to "conventional" liquids, that is to say liquids such as mineral oil, whereof the boiling curves are far away from the range of operating conditions indicated above and which thus, despite being on the one hand substantially incompressible, on the other hand have only a low volumetric expansion, and two-phase systems whereof the high volumetric expansion resulting primarily from the gas phase is negated once more by the highly compressible nature of the gas phase, there is a third group of substances which, although on the one hand they have a considerable level of volumetric expansion in the range of operating conditions in question, on the other hand are substantially incompressible, so that the volumetric expansion can be utilized substantially without limitation to compensate the dependence on temperature of the gas spring characteristic. The fundamental idea consists in the fact that, on the one hand, liquids have a relatively high volumetric expansion just before they boil but, on the other hand, because of their property of still being a liquid are substantially incompressible. Substances whereof the critical temperature is more than 100° C. above the upper limit temperature of the conventional range of operating temperatures of gas springs do not, however, have a useful volumetric expansion which significantly exceeds the useful volumetric expansion of mineral oil. Furthermore, the inventors have realized that with substances whereof the critical temperature is within the conventional range of operating temperatures of gas springs and in the case of which it is no longer possible to distinguish between the gas phase and the liquid phase at operating temperatures above the critical temperature, the density conditions are such that the behavior of these substances in this temperature range substantially corresponds to the behavior of a liquid. Finally, the inventors have also realized that it is possible to match the dimensions of the gas spring and the pressures prevailing in the gas spring to one another such that a transition to the liquid/gas two-phase condition by the respectively used compensating medium can be reliably prevented.

When, in the context of the present invention, the fact that the point indicating the state of the compensating medium lies above the vapor pressure curve is mentioned, reference is being made to the conventional representation of the pressure/temperature graph (pT graph), and hence the fact that the compensating medium is in its liquid phase is meant.

Advantageously, the second temperature should exceed the upper limit temperature of the range of operating temperatures of the gas spring by only approximately 60° C. Most favorably, indeed, the second temperature is substantially the same as the upper limit temperature of the range of operating temperatures of the gas spring, that is to say the critical temperature of the compensating medium is within the range of operating temperatures of the gas spring.

In a further development of the invention, the compensating medium may be selected, as a function of the conditions of use in each case, from the group comprising the substances carbon dioxide ($CO_2$), ethane ($C_2H_6$), propane ($C_3H_8$), hydrogen sulfide ($H_2S$), ammonia ($NH_3$), methylene chloride ($CH_3Cl$), sulfur dioxide ($SO_2$) and sulfur hexafluoride ($SF_6$). When the gas spring according to the invention is used in automotive vehicles, office chairs and similar equipment that comes more or less directly into contact with people, it goes without saying that a series of further selection criteria has also to be taken into account, for example the flammability or combustibility, toxicity, environmental friendliness and so on. Taking into consideration all these criteria, the use of carbon dioxide ($CO_2$) or sulfur hexafluoride ($SF_6$) is most advantageous, with carbon dioxide ($CO_2$) having a significantly higher useful volumetric expansion.

Furthermore, it has proved advantageous if the gas spring is designed such that, at an operating temperature of the gas spring exceeding the critical temperature of the compensating medium, the pressure in the compensating chamber is always higher than the critical pressure of the compensating medium.

Even though, in the context of the present invention, the use of the compensating medium according to the invention by itself is always preferred, so that the entire available volume of the compensating chamber can be utilized for temperature-dependent expansion and hence displacement of the compensating piston, in special cases it may be desirable to introduce into the compensating chamber a substance mixture comprising at least two substances, with at least one of the substances being a compensating medium having the properties according to the invention. This may be advantageous, for example, if the dimensions of the gas spring and thus for example also the volume of the compensating chamber are determined by external conditions in order to achieve the desired effect, but only part of the volume has to be filled with the compensating medium.

In addition to the disadvantages discussed above, the gas springs known from the published specifications mentioned at the outset have the further disadvantage of a complicated structure that requires a large overall size, in particular because of the construction of the compensating piston arrangement. For example, in the case of the gas spring known from DE 31 41 295 A1, a first piston which is displaceable in the working cylinder is connected by way of a spacer to a second piston which is arranged displaceably in an outer cylinder coaxially surrounding the working cylinder at a spacing therefrom, and separates a restoring or spring chamber from the compensating chamber.

It is thus a further object of the invention, in accordance with a second aspect of the invention, to provide a gas spring of the type mentioned at the outset which requires few and simple parts and a small overall size.

In accordance with the invention, this object is achieved by a gas spring of the type mentioned at the outset which further comprises a compensating cylinder which surrounds the working cylinder at a spacing therefrom, extends beyond the working cylinder by means of its end remote from that end of the gas spring at which the working rod comes out and is closed at this remote end, with the compensating chamber formed substantially by the annular chamber between the working cylinder and the compensating cylinder, and in which the compensating piston arrangement comprises a single compensating piston which is displaceably received in the compensating cylinder and takes the shape of a cup, with a cup base and a cylindrical portion, which projects away from the cup base in the direction of the end at which the working rod comes out, and which engages with the working cylinder, and with this compensating rod separating the working chamber, the compensating chamber and the restoring chamber from one another.

As a result of this construction, a single compensating piston both delimits the compensating chamber from the working chamber and delimits the compensating chamber and the working chamber from the restoring chamber. This means that both the number of parts and the overall length are reduced, since the diameter of the working chamber is smaller than the diameter of the restoring chamber and hence a large increase in volume for the working chamber is achieved as a result of a small displacement stroke by the compensating piston.

Taking into consideration a further reduction in the overall length of the gas spring, it is furthermore proposed that the cylindrical portion of the cup-shaped compensating piston should engage in the annular chamber between the compensating cylinder and the working cylinder. In this way, the entire length of the working chamber can be utilized for movement of the working rod.

It is possible to dispense with special guide elements between the compensating piston and the compensating cylinder if, for example, the cylindrical portion of the cup-shaped compensating piston abuts, at least by means of part of its outer peripheral surface, against the inner peripheral surface of the compensating cylinder. This contributes to further simplifying the structure and thus to reducing the number of parts.

Because a flange-like widened portion is provided at the free end of the working cylinder, the end which projects into the cylindrical portion of the cup-shaped compensating piston, and the compensating piston is displaceably guided on this widened portion, a further design parameter may be provided which allows the surface of the compensating piston on which the compensating medium acts and the volume of the compensating chamber at a given length of the compensating chamber to be determined independently of one another.

So that vibrations and a lateral deflection of the working cylinder relative to the compensating cylinder can be prevented, in a further development of the invention it is proposed that at least one supporting element should be provided in the annular chamber between the compensating cylinder and the working cylinder, and this at least one supporting element should keep the working cylinder in position relative to the compensating cylinder and have at least one through bore for compensating medium. In this arrangement, the compensating cylinder may have at least one stop for at least one supporting element, and this at least one stop ensures a predetermined minimum spacing between the at least one supporting element and the end at which the working rod comes out.

In addition or as an alternative to this, a plurality of supporting attached pieces for the working cylinder may be provided on the cylindrical portion, preferably close to the free end thereof. These supporting attached pieces may extend radially inward toward the working cylinder and may be constructed, for example, as blocks.

Preferably, the volume of the compensating medium increases continuously as the temperature continues to rise. In this case, it may in addition or as an alternative to this be wholly or partly incompressible.

Regardless of the fact that when the gas spring is constructed in accordance with the second aspect of the invention it is still advantageous to use a compensating medium which fulfills the conditions of the first aspect of the invention, it is possible for the compensating medium used in the case of a construction in accordance with the second aspect of the invention to be an oil or an expanding wax, or indeed a two-phase medium whereof one phase is liquid and the other phase is gaseous, for example sulfur hexafluoride.

As is known per se, the working chamber according to both aspects of the invention may be divided, by a piston connected to the working rod, into a first working chamber and a second working chamber, with the first working chamber adjacent to the compensating piston arrangement, and with the working rod extending through the second working chamber.

Furthermore, the restoring chamber according to both aspects of the invention may be filled, for example, with a pressurized gas which acts on the compensating piston in such a way that the volume of the working chamber is decreased. As a result of this, a particularly short overall length of the gas spring may be achieved. As an alternative or in addition to this, however, it is also possible for the restoring chamber to receive a spring arrangement which acts on the compensating piston. The spring arrangement may in this case comprise at least one pressure spring, for example at least one helical spring, a cup spring assembly or the like.

The invention will be explained in more detail below by way of some exemplary embodiments, with reference to the attached drawing, in which.

Figure 1:
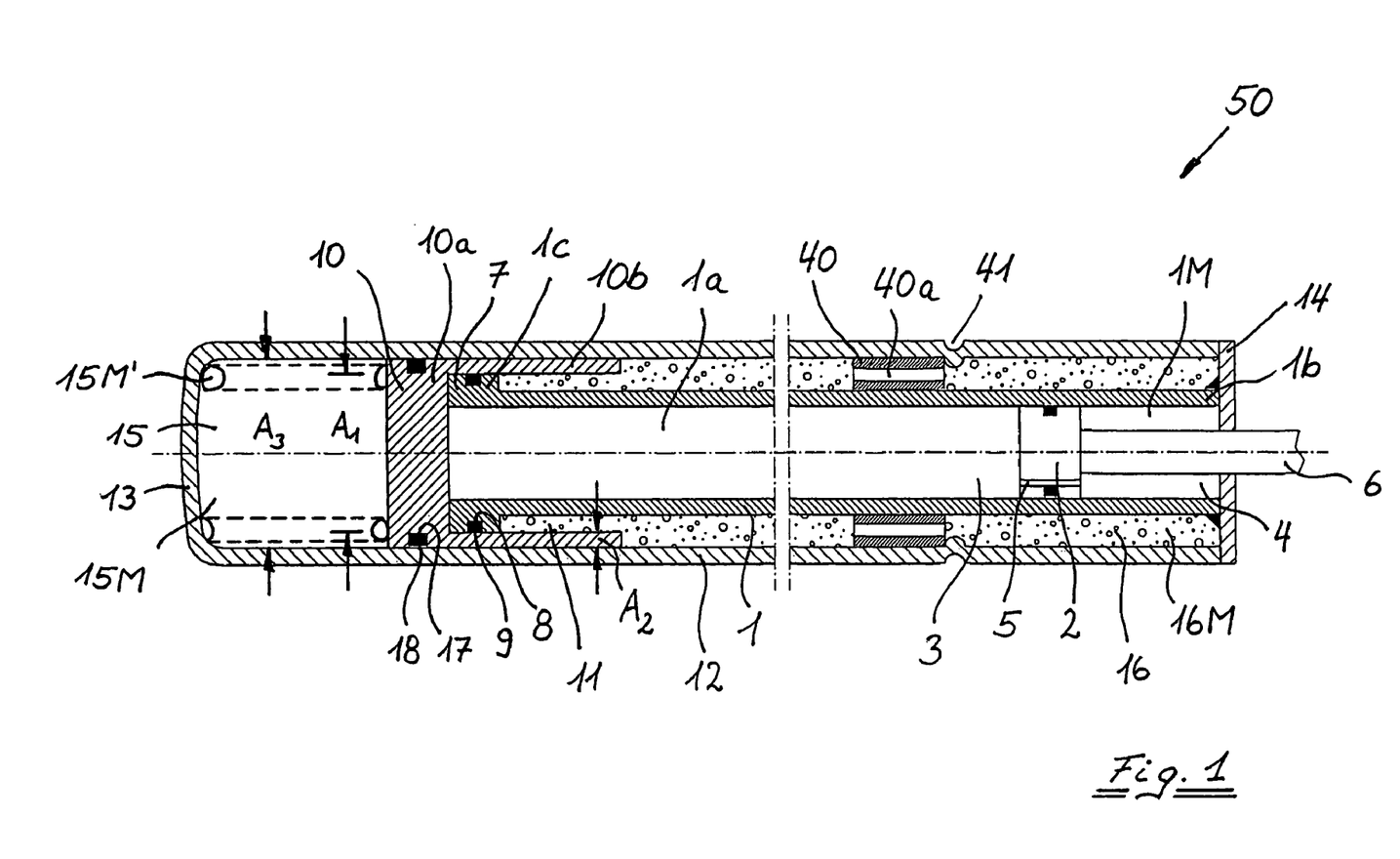
FIG. 1 shows a gas spring, in cross-section.

In FIG. 1, a gas spring according to the invention is designated 50 in a quite general way. The gas spring 50 has a working cylinder 1 in which a working piston 2 is displaceably guided. The working cylinder 2 divides the inner chamber 1a of the working cylinder 1 into a first working chamber 3 and a second working chamber 4. A piston rod 6 is secured to the working chamber 2, passes through the second working chamber 4, which is closed off to the outside, and is guided out of the gas spring 1 in sealed manner.

So that it is possible to damp the movement of the working piston 2 in the inner chamber 1a of the working cylinder 1, this chamber being filled with a pressurized gas 1M, a throttling bore 5 which connects the first working chamber 3 to the second working chamber 4 is provided in the working piston 2. In addition or as an alternative to this throttling bore 5, however, at least one longitudinal groove could also be made in the working cylinder 1.

The open end 1c of the working cylinder 1, the end opposite the end 1b at which the piston rod comes out, is closed by means of a cup-shaped compensating piston 10. The compensating piston 10 comprises a cup base 10a, which is in the shape of a circular disk in the exemplary embodiment illustrated, and a cylindrical portion 10b, which projects away from the cup base 10a in the direction of the end 1b at which the piston rod comes out. The cylindrical portion 10b, whereof the inner chamber forms the cup opening 11 of the compensating piston 10, is guided on the outer peripheral surface of the working cylinder 1. For this, the working cylinder 1 has at its end 1c a flange-like widened portion 7, in the radially outer peripheral outside surface whereof an annular groove 8 is provided, with an O ring 9 being inserted into this annular groove 8. The cylindrical portion 10b of the compensating piston 10 is guided such that it is displaceable on this flange-like widened portion 7 of the end 1c of the working cylinder 1 and is sealed by the O ring 9.

The pressurized gas 1M in the inner chamber 1a of the working cylinder 1 acts on the compensating piston 10 at the surface $A_1$, since even when the compensating piston 10 abuts against the free end 1c of the working cylinder 1, as illustrated in FIG. 1, the gas 1M penetrates into the abutment gap between the compensating piston 10 and the working cylinder 1. The pressure of this gas 1M exerts a force on the compensating piston 10 which is directed such that the inner chamber 1a of the working cylinder 1 becomes larger.

Moreover, the compensating piston 10 is arranged with its cylindrical outside surface axially displaceable in a compensating cylinder 12 which coaxially surrounds the working cylinder 1 at a spacing therefrom and is closed by a base 13 at its end remote from the piston rod 6. A closing disk 14 closes off both the working cylinder 1 and the compensating cylinder 12 on the piston rod side, so that outward sealing of the piston rod 6 from the atmosphere to the outside is performed by the seal of the compensating chamber 16 in static manner, that is to say without any moving parts.

The annular chamber 16 which is formed between the working cylinder 1 and the compensating cylinder 12 is filled with a compensating medium 16M, which expands as the temperature rises, that is to say its volume increases. The compensating medium 16M acts on the compensating piston 10 at the end face $A_2$ of the cylindrical portion 10b and exerts thereon a force which is directed such that the inner chamber 1a of the working cylinder 1 becomes larger.

To seal off the compensating chamber 16 from a restoring chamber 15 which is formed between the compensating piston 10 and the base 13 and which is filled with a pressurized gas 15M, the compensating piston 10 has in its outside surface a radially peripheral groove 17 into which an annular seal 18 is inserted. For this reason, the pressurized gas 15M in the restoring chamber 15 acts on the compensating piston 10 at the surface $A_3$ and exerts thereon a force which is directed such that the inner chamber 1a of the working cylinder 1 becomes smaller.

The pre-tension of the compensating piston 10 in the direction of the free end 1c of the working cylinder 1 could, in addition or as an alternative to providing the pressurized gas 15M in the restoring chamber 15, also be created by the arrangement in the restoring chamber 15 of at least one pressure spring 15M' which acts on the compensating piston 10 and/or by the arrangement in the compensating chamber 16 of at least one tension spring which is connected to the compensating piston 10.

As has already been mentioned above, the inner chamber 1a of the working cylinder 1 is filled with a pressurized gas 1M so that the compensating piston 10 is pre-tensioned into the compensating cylinder 12, that is such that the restoring chamber 15 becomes smaller. The pressure of the gas 15M which is provided in the restoring chamber 15, and the surfaces $A_1$ and $A_3$ on which pressure acts, are selected and designed in such a way that a force acting on the compensating piston 10 such that the restoring chamber 15 becomes larger is always greater—that is, in particular regardless of the position of the working piston 2 in the inner chamber 1a of the working cylinder 1—than the force which acts on the compensating piston 10 as a result of the pressure in the inner chamber 1a of the working cylinder 1.

It should also be pointed out that a supporting element 40 which supports the working cylinder 1 against the compensating cylinder 12 and keeps it in position relative to the latter is furthermore provided. The supporting element 40 has at least one through bore 40a for compensating medium 16M, which provides as little hindrance as possible to the passage of compensating medium 16M therethrough. A bead 41 on the compensating cylinder 12 ensures that the supporting element 40 always maintains a predetermined minimum spacing from the end 1b of the working cylinder 1 on the piston rod side. It goes without saying that it is also possible for a plurality of spacer elements of this kind to be provided.

In order to achieve optimum utilization of the compensating medium 16M, at the lowest temperature provided for operation of the gas spring 50, for example −30° C., the compensating piston 10 is located close to that end 1c of the flange-like widened portion 7 having the end face. This means that the volume of the inner chamber 1a of the working cylinder 1 is also at a minimum.

If the ambient temperature rises, the compensating medium 16M expands and moves the compensating piston 10 toward the base 13 of the compensating cylinder 12, that is to say such that the restoring chamber 15 becomes smaller. As a result of this, the inner chamber 1a of the working cylinder 1 becomes larger. This means that the pressure which, as a result of the rise in temperature in the inner chamber 1a of the working cylinder 1, would rise if the volume of the inner chamber 1a remained constant does not, in fact, increase or does so only to a limited extent, because the increase in volume of the inner chamber 1a of the working cylinder 1 counters the effects of the increase in temperature.

According to the invention, carbon dioxide ($CO_2$) is preferably used as the compensating medium 16M, and as a result of the corresponding design of the geometry or dimensions of the gas spring 50 and the components thereof this carbon dioxide is kept at such a high pressure in the compensating chamber 16 that the point thereof indicating its state on the pressure/temperature graph (pT graph) is, in the conventional range of operating temperatures for gas springs, that is to say between a lower limit temperature $T_{lower}$ of approximately −30° C. and an upper limit temperature $T_{upper}$ of approximately +80° C., always above or at any rate on the vapor pressure curve. The fact that the critical temperature $T_K$ of carbon dioxide is approximately 31° C. and hence is within the range of operating temperatures in question, and the fact that at temperatures above the critical temperature it is no longer possible to distinguish between the gas phase and the liquid phase, does not, surprisingly, have any disadvantageous effects on the useful volumetric expansion, which desirably is high, since the density of carbon dioxide at the pressures relevant in this case is so high that it behaves substantially like a liquid.

As a result of dimensioning the gas spring 50 in accordance with the invention, it is even ensured that the pressure of the carbon dioxide at temperatures above the critical temperature $T_K$ is always above the critical pressure $p_K$ of carbon dioxide, which is 73.8 bar.

The term "useful volumetric expansion $\Delta V$" or, to be more precise, the term "relative useful volumetric expansion $\Delta V/V$" is used, in the context of the present invention, to mean the difference between the increase in volume brought about by a rise in temperature and the reduction in volume brought about by the simultaneous rise in pressure, that is to say:

$$\Delta V/V = (T_{upper} - T_{lower}) \cdot \gamma - (p_{upper} - p_{lower}) \cdot \alpha$$

where $T_{upper}$ is the upper limit temperature of the range of operating temperatures, $T_{lower}$ is the lower limit temperature of the range of operating temperatures, $p_{upper}$ is the pressure in the compensating chamber at the upper limit temperature, $p_{lower}$ is the pressure in the compensating chamber at the lower limit temperature, $\gamma$ is the volumetric expansion coefficient of the compensating medium, and $\alpha$ is the compressibility factor of the compensating medium.

The relative useful volumetric expansion $\Delta V/V$ of the mineral oil which is used as a comparison medium is, in the range of operating temperatures indicated above, approximately 6.2%.

In contrast, carbon dioxide gives a relative useful volumetric expansion $\Delta V/V$ of 31.8%. Moreover, carbon dioxide offers the advantages of being available at low cost and of being non-toxic, environmentally friendly and non-flammable and—even when mixed with other substances, in particular air—of not being explosive.

Further compensating media 16M which may readily be used in gas springs which come directly or indirectly into contact with people are nitrous oxide ($N_2O$) and sulfur hexafluoride ($SF_6$). The critical temperature $T_K$ of nitrous oxide ($N_2O$) is approximately 46.4° C. and its critical pressure $p_K$ is approximately 72.5 bar. Furthermore, nitrous oxide has a relative useful volumetric expansion $\Delta V/V$ of approximately 26%, which is only slightly below that of carbon dioxide. The critical temperature $T_K$ of sulfur hexafluoride ($SF_6$) is approximately 45.6° C. and its critical pressure $p_K$ is approximately 37 bar. Furthermore, sulfur hexafluoride has a relative useful volumetric expansion $\Delta V/V$ of approximately 10.7%, which while somewhat below that of carbon dioxide is still significantly above that of mineral oil.

For special applications in which properties such as flammability, explosiveness, toxicity, the possibility of odor pollution and so on do not represent restrictive properties or even criteria for exclusion, it is additionally possible to use ethane, propane, hydrogen sulfide, ammonia, methylene chloride and sulfur dioxide. The parameters of these substances are shown in Table 1 below.

TABLE 1

|  | $T_K$ [° C.] | $p_K$ [bar] | $\Delta V/V$ [%] |
|---|---|---|---|
| Ethane | 32.1 | 50.3 | 16.1 |
| Propane | 96.9 | 43.6 | 13.0 |
| Hydrogen sulfide | 100.4 | 89.0 | 19.7 |
| Ammonia | 132.4 | 113.0 | 22.6 |
| Methylene chloride | 143.0 | 68.9 | 14.6 |
| Sulfur dioxide | 157.5 | 80.3 | 16.6 |

It should be pointed out here that the values indicated above for the relative useful volumetric expansion $\Delta V/V$ have been calculated on the basis of the formula indicated above, with the simplifying assumption, not dependent on the actual construction of the gas spring, that the pressure in the compensating chamber 16 is approximately 440 bar at the upper limit temperature of +80° C. and approximately 50 bar at the lower limit temperature of −30° C. The values indicated can therefore give only an idea, in the area of the order of magnitude, of the suitability of one substance or another as a compensating medium.

Some variant embodiments on the gas spring according to the invention will be explained in more detail below.

Figure 2:
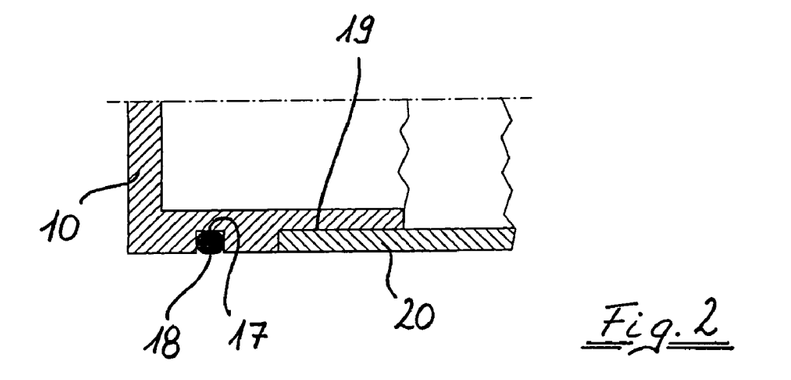
FIG. 2 shows a detail of a compensating piston, in cross-section.
Figure 4:
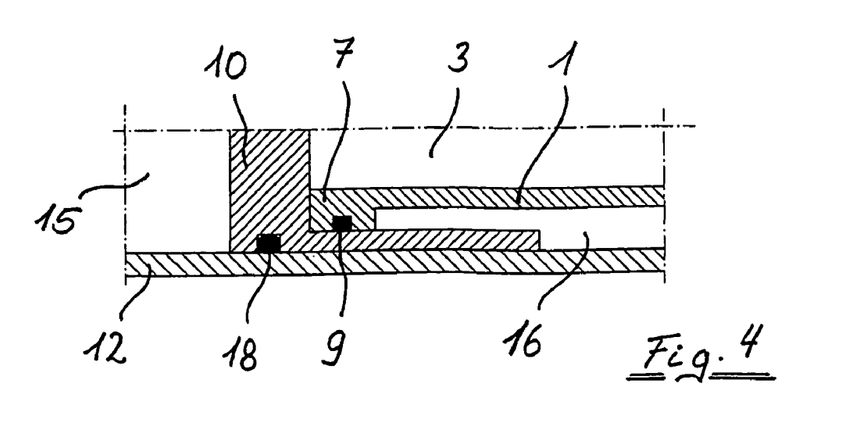
FIG. 4 shows a detail of a working cylinder, a compensating cylinder and a compensating piston of the gas spring from FIG. 1, in cross-section.

In FIGS. 1 and 4, the compensating piston 10 is made in one piece, whereas in FIG. 2 it has, on its cylindrical outside surface, a radially peripheral stepped annular depression 19 into which a sealing sleeve 20 which lengthens the cup and which has the same external diameter as the compensating piston 10 is fixedly inserted. At the end face, the sealing sleeve 20 may be sealed off from the compensating piston 10 by way of a sealing element (not illustrated) such as an O ring.

Figure 3:
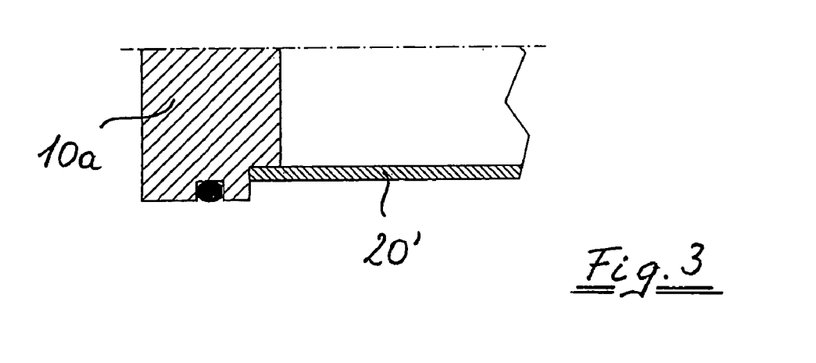
FIG. 3 shows a view similar to FIG. 2 of a modified embodiment.

Although the compensating piston 10 is in the form of a cup in the embodiment according to FIG. 2 too, it should be pointed out here with reference to FIG. 3 that the cup shape may also in principle be formed only by the cooperation of a substantially disk-shaped base part 10a and a substantially cylindrical sleeve 20'. If the thickness of the disk-shaped base part 10a is sufficient for the length over which the compensating piston 10 has to be guided in the compensating cylinder 12, then the sleeve 20' does not necessarily have to have the same external diameter as the compensating piston 10.

FIGS. 5 to 12 show different embodiments of that end of the working cylinder 1 which is on the compensating piston side, and its sealing off from the compensating piston 10.

Figure 5:
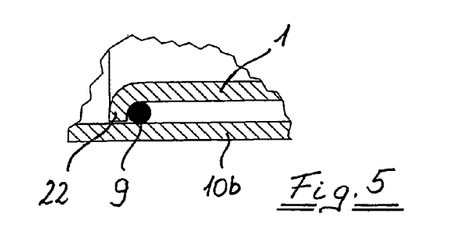
FIG. 5 shows a detail of a second exemplary embodiment of an end of the working cylinder which is on the compensating piston side, in cross-section.

In FIG. 5, the end 1c of the tubular working cylinder 1 which is on the compensating piston side is shaped radially outwardly into a flange 22, and receives the O ring 9 in the hollow formed by this trumpet shape.

Figure 6:
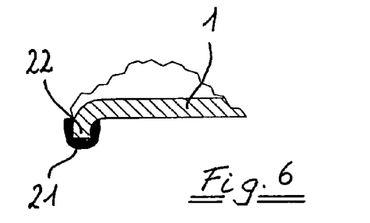
FIG. 6 shows a detail of a third exemplary embodiment of the end of the working cylinder on the compensating piston side, in cross-section.
Figure 7:
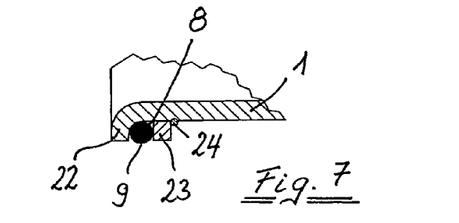
FIG. 7 shows a detail of a fourth exemplary embodiment of the end of the working cylinder on the compensating piston side, in cross-section.
Figure 8:
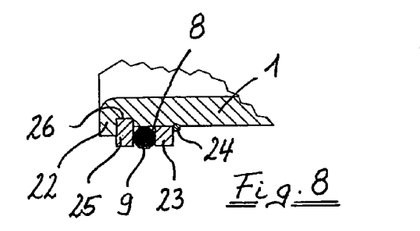
FIG. 8 shows a detail of a fifth exemplary embodiment of the end of the working cylinder on the compensating piston side, in cross-section.

In FIGS. 6, 7 and 8 too, the end of the tubular working cylinder on the compensating piston side is shaped radially outwardly to give a flange 22. In this case, in FIG. 6 a sealing ring 21 with a U-shaped cross-section is pushed onto the flange 22.

In FIG. 7, a supporting ring 23 which surrounds the working cylinder 1 is arranged parallel to the flange 22 and at a spacing therefrom, and is secured to the working cylinder 1 by a securing ring 24. The annular gap between the flange 22 and the supporting ring 23 forms the annular groove 8 receiving the O ring 9.

In FIG. 8, a second supporting ring 25 abuts against the flange 22, parallel to the supporting ring 23 secured by the securing ring 24 and at a spacing therefrom, and projects radially into an annular groove 26 in the working cylinder 1. The annular groove 8 receiving the O ring 9 is formed between the two supporting rings 23 and 25.

Figure 9:
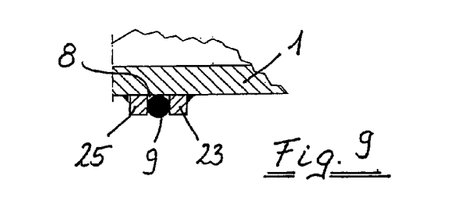
FIG. 9 shows a detail of a sixth exemplary embodiment of the end of the working cylinder on the compensating piston side, in cross-section.

In FIG. 9, two supporting rings 23 and 25 which are parallel to one another and at a spacing from one another are bonded to the outside surface of the working cylinder 1 and form between them the annular groove 8 receiving the O ring 9.

Figure 10:
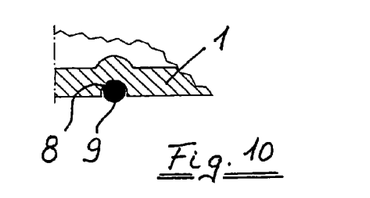
FIG. 10 shows a detail of a seventh exemplary embodiment of the end of the working cylinder on the compensating piston side, in cross-section.
Figure 11:
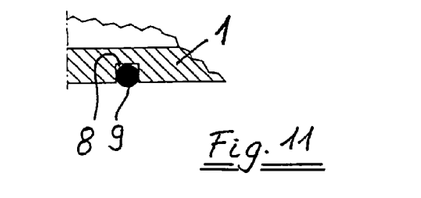
FIG. 11 shows a detail of an eighth exemplary embodiment of the end of the working cylinder on the compensating piston side, in cross-section.

In the exemplary embodiments in FIGS. 10 and 11, there is no flange-like widened portion, but instead annular grooves 8 are made in the outside surface of the working cylinder 1, to receive the O ring 9. In FIG. 10, the annular groove is produced by radial deformation, and in FIG. 11 it is shaped by machining.

Figure 12:
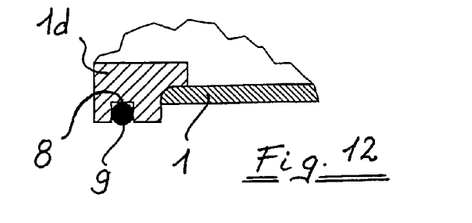
FIG. 12 shows a detail of a ninth exemplary embodiment of the end of the working cylinder on the compensating piston side, in cross-section.

In accordance with FIG. 12, the annular groove 8 receiving the O ring 9 is made in a separate part 1d which is, however, connected to the working cylinder 1 such that it is in fixed relationship therewith for operation.

FIGS. 13 to 18 show that end of the gas spring 50 which is on the piston rod side.

Here, the end of the tubular compensating cylinder 12 which is on the piston rod side is shaped to form a radially inwardly directed flange 27. An annular supporting element 28 abuts axially against the flange 27. The supporting element 28 is surrounded on its radially peripheral outside surface by the compensating cylinder 12, and in the exemplary embodiments of FIGS. 13, 16 and 17 a bead 29 is created in the compensating cylinder 12 by deformation and, in FIGS. 13 and 17, engages radially in a corresponding recess 30 in the supporting element 28.

Figure 13:
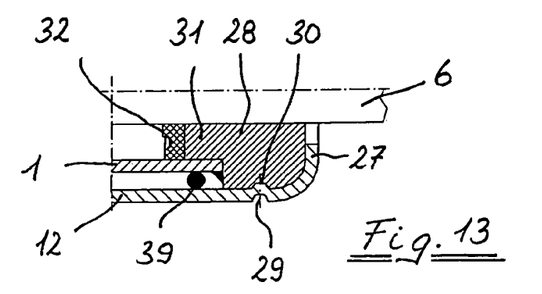
FIG. 13 shows a detail of a second exemplary embodiment of that end of the gas spring which is on the piston rod side, in cross-section.
Figure 16:
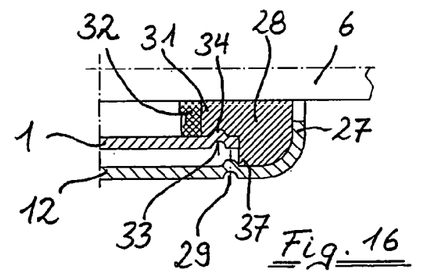
FIG. 16 shows a detail of a fifth exemplary embodiment of the end of the gas spring on the piston rod side, in cross-section.
Figure 17:
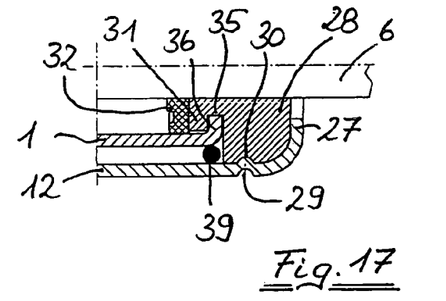
FIG. 17 shows a detail of a sixth exemplary embodiment of the end of the gas spring on the piston rod side, in cross-section.

The end of the supporting element 28 that projects into the gas spring has a step 31 whereof the diameter is reduced to match the internal diameter of the working cylinder 1, and this step 31 engages in the end of the working cylinder 1.

An annular sealing element 32 is supported against the supporting element 28 at the end face and abuts radially inwardly against the piston rod 6 and radially outwardly against the inner wall of the working cylinder 1.

Figure 14:
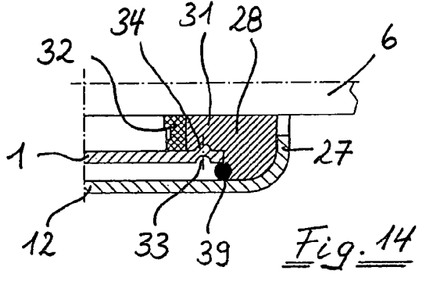
FIG. 14 shows a detail of a third exemplary embodiment of the end of the gas spring on the piston rod side, in cross-section.
Figure 15:
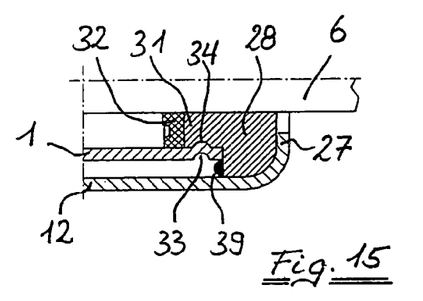
FIG. 15 shows a detail of a fourth exemplary embodiment of the end of the gas spring on the piston rod side, in cross-section.

In FIG. 13, the working cylinder is bonded to the supporting element 28, whereas in the exemplary embodiments of FIGS. 14 to 16 a radially inwardly directed bead 33 is created by deforming the working cylinder 1 and engages in a corresponding recess 34 in the step 31 of the supporting element 28.

In FIG. 17, the step 31 of the supporting element 28 has, in its radially peripheral outside surface, an annular groove 35 in which a flange-like radially inwardly directed shaping 36 of the end of the working cylinder 1 engages.

In FIG. 16, the shoulder 37, that part leading to the step 31, of the supporting element 28 abuts against the bead 29.

Figure 18:
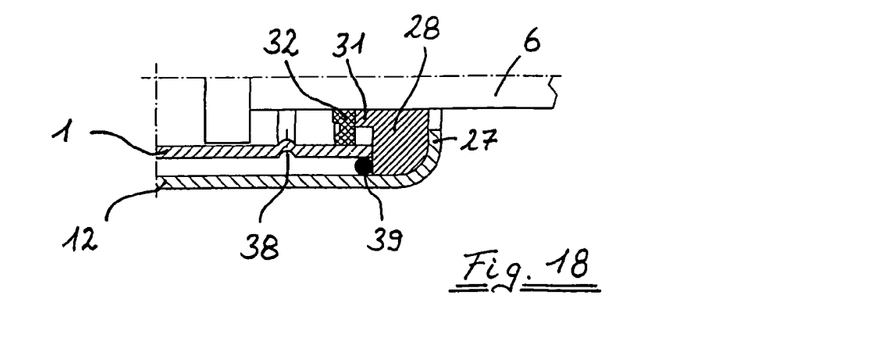
FIG. 18 shows a detail of a seventh exemplary embodiment of the end of the gas spring on the piston rod side, in cross-section.

In FIG. 18, a radially inwardly directed bead 38 is created at an axial spacing from the sealing element 32, by deforming the working cylinder 1, and forms a stop which limits the outward movement of the piston 2.

In FIGS. 13 to 15 and 17 to 18, a sealing ring 39 is arranged in the compensating chamber 16, close to the supporting element 28 or axially abutting against the latter, and this sealing ring 39 abuts radially inwardly against the outer wall of the working cylinder 1 and radially outwardly against the inner wall of the compensating cylinder 2, and seals off the compensating chamber 16 from the supporting element 28.

The invention claimed is:

1. A gas spring (50), comprising
a working cylinder (1) which, together with a compensating piston arrangement (10), delimits a working chamber (1a) filled with a working medium (1M), and
a working rod (6) which projects displaceably through an opening in the working cylinder (1) into the working chamber (1a),
in which the compensating piston arrangement (10) is acted upon by the pressure of the working medium (1M) and the pressure of a compensating medium (16M), which is provided in a compensating chamber (16) and expands if the temperature rises such that the volume of the working chamber (1a) increases, and by a restoring medium (15M), which is provided in a restoring chamber (15) such that the volume of the working chamber (1) decreases, characterized in that the compensating medium (16M) is selected such that its critical temperature ($T_K$) is between a first temperature ($T_1$) and a second temperature ($T_2$), with the first temperature ($T_1$) being substantially the same as the lower limit temperature ($T_{lower}$) of a range of operating temperatures of the gas spring (50), and the second temperature ($T_2$) exceeding the upper limit temperature ($T_{upper}$) of the range of operating temperatures of the gas spring (50) by approximately 100° C., and in that the surface ($A_2$) of the compensating piston arrangement (10) on which the compensating medium (16M) acts, the surface ($A_1$) of the compensating piston arrangement (10) on which the working medium (1M) acts, the volume of the working chamber (1a) at a design temperature of the gas spring (50), the volume of the compensating chamber (16) at the design temperature of the gas spring (50) and the restoring force of the restoring medium (15M) acting on the compensating piston arrangement (10) at the design temperature of the gas spring (50) are dimensioned and matched to one another such that, at an operating temperature ($T_B$) of the gas spring (50) which does not exceed the critical temperature ($T_K$) of the compensating medium (16M), the point indicating the state of the compensating medium (16M) lies on or above the vapor pressure curve.

2. A gas spring according to claim 1, characterized in that the second temperature ($T_2$) exceeds the upper limit temperature ($T_{upper}$) of the range of operating temperatures of the gas spring (50) by approximately 60° C.

3. A gas spring according to claim 1, characterized in that the compensating medium (16M) is selected from the group comprising the substances carbon dioxide, ethane, propane, hydrogen sulfide, ammonia, methylene chloride, sulfur dioxide, sulfur hexafluoride and nitrous oxide.

4. A gas spring according to claim 1, characterized in that, at an operating temperature of the gas spring (50) exceeding the critical temperature ($T_K$) of the compensating medium (16M), the pressure in the compensating chamber (16) is always higher than the critical pressure ($P_K$) of the compensating medium.

5. A gas spring according to claim 1, characterized in that it further comprises a compensating cylinder (12) which surrounds the working cylinder (1) at a spacing therefrom, extends beyond the working cylinder (1) by means of its end (1c) remote from that end (1b) of the gas spring (50) at which the working rod comes out and is closed at this remote end, with the compensating chamber (16) formed substantially by the annular chamber between the working cylinder (1) and the compensating cylinder (12), and in that the compensating piston arrangement comprises a single compensating piston (10) which is displaceably received in the compensating cylinder (12) and takes the shape of a cup, with a cup base (10a) and a cylindrical portion (10b), which projects away from the cup base (10a) in the direction of the end (1b) at which the working rod comes out, and which engages with the working cylinder (1), and with the compensating rod (10) separating the working chamber (1a), the compensating chamber (16) and the restoring chamber (15) from one another.

6. A gas spring according to claim 5, characterized in that the cylindrical portion (10b) of the compensating piston (10) engages in the annular chamber (16) between the compensating cylinder (12) and the working cylinder (1).

7. A gas spring according to claim 5, characterized in that the cylindrical portion (10b) of the compensating piston (10) abuts, at least by means of part of its outer peripheral surface, against the inner peripheral surface of the compensating cylinder (12).

8. A gas spring according to claim 5, characterized in that a flange-like widened portion (7) is provided at the free end (1c) of the working cylinder (1), the end which projects into the cylindrical portion (10b) of the compensating piston (10), and the compensating piston (1) is displaceably guided on this widened portion (7).

9. A gas spring according to claim 5, characterized in that at least one supporting element (40) is provided in the annular chamber (16) between the compensating cylinder (12) and the working cylinder (1), and this at least one supporting element (40) keeps the working cylinder (1) in position relative to the compensating cylinder (12) and has at least one through bore (40a) for compensating medium (16M).

10. A gas spring according to claim 9, characterized in that the compensating cylinder (12) has at least one stop (41) for at least one supporting element (40), and this at least one stop (41) ensures a predetermined minimum spacing between the at least one supporting element (40) and the end (1b) at which the working rod comes out.

11. A gas spring according to claim 5, characterized in that a plurality of supporting attached pieces for the working cylinder (1) are provided on the cylindrical portion (10b).

12. A gas spring according to claim 5, characterized in that the volume of the compensating medium (16M) increases continuously as the temperature continues to rise.

13. A gas spring according to claim 5, characterized in that the compensating medium (16) is wholly or partly incompressible.

14. A gas spring according to claim 5, characterized in that the compensating medium (16M) is an oil or an expanding wax or a two-phase medium whereof one phase is liquid and the other phase is gaseous.

15. A gas spring according to claim 1, characterized in that the working chamber (1a) is divided, by a piston (2) connected to the working rod (6), into a first working chamber (3) and a second working chamber (4), with the first working chamber (3) adjacent to the compensating piston arrangement (10), and with the working rod (6) extending through the second working chamber (4).

16. A gas spring according to claim 1, characterized in that the restoring medium (15M) is formed by a pressurized gas which is provided in the restoring chamber (15).

17. A gas spring according to claim 1, characterized in that the restoring medium (15M) is formed by a spring arrangement.

18. The gas spring according to claim 2, wherein ($T_2$) is substantially the same as the upper limit temperature ($T_{upper}$) of the range of operating temperatures of the gas spring (50).

19. The gas spring according to claim 11, wherein the plurality of supporting attached pieces for the working cylinder are close to the free end thereof.

* * * * *